Patented May 22, 1951

2,553,617

UNITED STATES PATENT OFFICE 2,553,617

COLORING COMPOSITION CAPABLE OF FORMING A FILM ON WATER

Arthur S. Wendt, New York, N. Y., assignor to Fred Fear & Company, Brooklyn, N. Y., a corporation of New York No Drawing. Application March 7, 1946, Serial No. 652,815

4 Claims. (Cl. 106—19)

This invention relates to improved coloring compositions suitable for applying multi-color designs to objects made of metal, wood, plastics, paper and the like such as toys, novelties and Easter eggs.

An object of this invention is to provide a single or multi-color composition which forms on a body of water at the right temperature a coloring film of the requisite properties to permit decorating an object by submerging it and withdrawing it through the film.

An important object of this invention is to provide a composition of this type which is non-toxic and, therefore, may be applied to children's toys, edible materials such as Easter eggs and the like with safety.

A more specific object of this invention is to provide a composition of this type employing pure food colors certified by the Food, Drug and Cosmetics Act.

A still further object of the invention is to provide a coloring composition which will form a film on water employing only the certified pure food colors which are normally water soluble.

A further object of this invention is to provide a composition of this type containing the pure food colors, which composition will form and maintain a film on a body of water at the proper temperature and yet be adherent to the surface of an object when applied thereto.

A broad object of this invention is to provide a composition of this type comprising a mixture of a wax, a resin, a wetting agent, a film former and a certified food color having a melting point within a predetermined desired range.

A still further object of this invention is to provide a composition of this type which can be put up in the form of small granules capable of being sifted upon a body of water of the proper temperature to form thereon a thin solid or variegated colored film capable of coating an object when withdrawn from submersion in the water through the film floating thereon.

Other and more detailed objects of the invention will be apparent from the following description of several embodiments thereof.

This invention resides substantially in the composition comprising the ingredients as defined in the appended claims.

The oil-soluble certified colors approved for food and similar purposes under the Food, Drug and Cosmetics Act are relatively limited in number and have characteristics which make them difficult to handle and apply to objects such as, for example, toys and Easter eggs. These colors are greasy and do not handle well and are, therefore, unsuitable for direct use as such by the consuming public. The water-soluble colors bleed into an aqueous layer so that they are not directly suitable, for example, in coloring Easter eggs in variegated designs. Some attempts have been made to use these colors in wax mixtures, but they still were subject to the difficulty of bleeding into the aqueous layer. This suggested the use of aluminum lakes of such food colors but in wax mixtures they do not spread well on the surface of the aqueous layer and fail to form sufficiently coherent films. These difficulties were in part overcome by the use of dammar gum in mixture with waxes and alumina color lakes. Such mixtures are the best that were available and have been used notwithstanding several important disadvantages. Such mixtures are slightly soluble in water so that the color bleeds into the aqueous layer, thus overlying the desired color design with a solid color. More importantly, however, such mixtures are unstable and have a very short shelf life. Thus when used as coloring material for Easter eggs they had to be prepared and used very promptly so that any material left over at the end of the Easter season had to be thrown away.

Obviously such a short life for these mixtures has prevented their extensive use. It is difficult to prepare and distribute these coloring materials in sufficient quantity within the short life thereof to make them an attractive item for resale.

A broad object of this invention is to provide color compositions of this general type which are quite stable and have a long shelf life so that they can be prepared well in advance of the time of use and can be held over for more than a year if necessary.

A composition of this type and especially one designed for coloring eggs at Easter time must have the following characteristics:

1. Form a completely homogeneous color film by complete dispersion of the alumina color lake in the final composition;

2. Form a film which will spread uniformly on the surface of water;

3. Form a film of sufficient strength so that it will not break on the surface of water and yet not be too cohesive to prevent proper spreading;

4. Have a melting point as a mixture of preferably 140° F., but can be between 120°–212° F.;

5. Employ ingredients which have the above noted physical properties in proper balance and in which all the ingredients are mutually compatible for attainment of the desired objects;

6. Comprise a stable mixture which will retain these desired physical properties over a relatively long period of time; and 7. Have all of the above properties built around the use of certified pure food colors.

The composition broadly consists of a mixture of waxes insoluble or non-dispersible in water in the temperature range 120°–212° F. These waxes should have optimum spreading characteristics on warm water and their melting points should not be less than 35° C. The insoluble and non-dispersible ester waxes are best suited for this purpose. Examples of this are glyceryl distearate, glyceryl tristearate, ethylene glycol distearate, diethylene glycol distearate, and propylene glycol distearate. The next ingredient of the composition is a resin compatible with the ester waxes and the other ingredients of the composition. Suitable resins are pentaerithrytyl tetra-abietate, ester gums, hydrogenated rosins and their esters, maleic modified ester gums, cumarone-indene resins, modified phenolics, and terpene resins.

The next ingredient of the composition which is broadly a film former must be compatible with the waxes and resins employed. A desired characteristic of this film former is that it be flexible and not prevent the spreading of the composition on the surface of heated water. It should avoid agglomerating the ingredients on the surface of the water. Ethyl cellulose of varying viscosity or rubber may be used.

The next ingredient of the composition may be generally termed a wetting agent. It should be insoluble or only slightly soluble in water and yet have enough hydrophilic groups to cause the film to spread on the surface of the water without bleeding into it. It should also be soluble in ester waxes and compatible with the film former. Suitable wetting agents are sorbitan esters such as sorbitan laurate (Span 20) or one of the class of dialkyl sodium sulfo succinate, as for example, dioctyl sodium sulfo succinate (Aerosol OT).

Finally, of course, the mixture includes a suitable aluminum lake of a certified food color.

A few specific formulas for compositions in accordance with this invention are given below in which the parts are specified by weight, and in which the term "FD&C" refers to the Food, Drug and Cosmetic color designation.

*Formula 1*

(1) 79 parts glyceryl di-stearate
(2) 10 parts glyceryl abietate
(3) 2 parts sorbitan laurate
(4) 2 parts ethyl cellulose
(5) 7 parts aluminum lake of FD&C Red #3, #773 Erythrosine and/or FD&C Yellow #5, #640 Tartrazine and/or FD&C Blue #1, Brilliant Blue and/or FD&C Green #3, Fast Green The ingredients 1, 2 and 3 are melted at 180° F. and item No. 4 is added with constant stirring. After the film former, that is item No. 4 is thoroughly dissolved, the alumina color lake is added and thoroughly dispersed. At this point it may be noted that whereas the formula above indicates the use of only one color, a mixture of colors suitable for the purpose can be employed. The final mixture is cooled and then ground to particles of one millimeter size representing the finished article, the use of which will be described later.

*Formula 2*

(1) 71 parts ethylene glycol stearate
(2) 16 parts dammar gum
(3) 0.1 part dioctyl sodium sulfo succinate
(4) 3 parts ethyl cellulose
(5) 10 parts of a pure food color in an aluminum lake or a mixture of several colors, such as FD&C Red #1, #80 Ponceau 3R and/or FD&C Yellow #6, Sunset Yellow and/or FD&C Blue #2, #1180 Indigotine and/or FD&C Green #1, Guinea Green B The compounding and preparation of the final product is as before.

*Formula 3*

(1) 40 parts propylene glycol stearate
   40 parts japan wax
(2) 5 parts pentaerythrityl tetra-abietate
(3) 0.1 part dioctyl sodium sulfo succinate or sorbitan palmitate
(4) 1 part ethyl cellulose
(5) 14 parts of aluminum color lake which may comprise one or more of the following colors: FD&C Red #2, #184 Amaranth and/or FD&C Yellow #1, Naphthol Yellow S#10 and/or FD&C Orange #1, #150 Orange I and/or FD&C Green #2, #670 Light Green SFY The compounding and preparation of the final product is as before.

*General formula*

(1) A wax
(2) A resin
(3) A wetting agent
(4) A film former
(5) Alumina color lake The following table identifies the FD&C color numbers in terms of their respective color indices or by their chemical composition.

| FD&C No. | Color Index or Composition |
|---|---|
| Red #3 | 773. |
| Yellow #5 | 640. |
| Blue #1 | Disodium salt of 4-([4-(N-ethyl-p-sulfobenzyl-amino)-phenyl]-(2-sulfoniumphenyl)-methylene]-[1-N-ethyl-N-p-sulfobenzyl)-Δ²,⁵-cyclohexadienimine]. |
| Green #3 | Disodium salt of 4-([4-(N-ethyl-p-sulfobenzyl-amino)-phenyl]-(4-hydroxy-2-sulfoniumphenyl)-methylene)-[1-N-ethyl-(N-p-sulfobenzyl)-Δ²,⁵-cyclohexadienimine]. |
| Red #1 | 80. |
| Yellow #6 | Disodium Salt of 1-p-sulfophenylazo-2-naphthol-6-sulfonic acid. |
| Blue #2 | 1,180. |
| Green #1 | 666. |
| Red #2 | 184. |
| Yellow #1 | 10. |
| Orange #1 | 150. |
| Green #2 | 670. |

When the one millimeter particles of any one of these compositions are sprinkled upon water at a temperature of 120° to 212° F., a thin, strong, coherent film of a single color or several colors, depending upon whether the composition contains one or more colors, is formed. When an object such as an egg is passed through the film into the water and then withdrawn through the film, it is covered with a thin variegated color film of a very pleasing design. It may also be used to make a permanent record of the flow lines on a liquid surface caused by passing a solid object through the surface. This may be of use in the engineering design of streamlined aircraft or seacraft. Very importantly such compositions, as previously mentioned, are quite stable and have a long shelf life so that they can be prepared and distributed well in advance of the time of use.

Those skilled in this art will readily appreciate that the subject matter of this invention is capable of some variation and I do not, therefore, desire to be limited by the disclosure but only as required by the appended claims.

What is claimed is:

1. A coloring composition comprising small discrete particles capable upon heating of forming a thin coherent film on an aqueous surface, said particles comprising an intimate mixture of an alkane polyol stearate insoluble and non-dispersible in water in the temperature range between about 120° F. and about 212° F.; a substantially water-insoluble wetting agent; a resin compatible with the rest of the ingredients of said mixture and selected from the group consisting of pentaerithrytyl tetra-abietate, ester gums, hydrogenated rosins, dammar gum and cumarone-indene resins; an alkyl cellulose ether; and an alumina pure food color lake.

2. Coloring material comprising small discrete particles capable upon heating of forming a thin coherent, non-bleeding film on an aqueous surface, said particles comprising an intimate mixture of an alkane polyol stearate insoluble and non-dispersible in water in the temperature range between about 120° F. and about 212° F.; a substantially water-insoluble wetting agent; a resin compatible with the rest of the ingredients of said mixture and selected from the group consisting of pentaerithrytyl tetra-abietate, ester gums, hydrogenated rosins, dammar gum and cumarone-indene resins; an alkyl cellulose ether; and an alumina pure food color lake.

3. A siftable coloring material comprising small discrete particles capable upon heating and upon deposition on an aqueous surface of forming a coherent film on said surface and without penetration through said surface, said particles comprising an intimate mixture of an alkane polyol stearate insoluble and non-dispersible in water in the temperature range between about 120° F. and about 212° F.; a substantially water-insoluble wetting agent; a resin compatible with the rest of the ingredients of said mixture and selected from the group consisting of pentaerithrytyl tetra-abietate, ester gums, hydrogenated rosins, dammar gum and cumarone-indene resins; an alkyl cellulose ether; and an alumina pure food color lake.

4. The composition of claim 1, in which the wetting agent comprises dialkyl sodium sulfo succinate.

ARTHUR S. WENDT.

REFERENCES CITED

The following references are of record in the file of this patent:

UNITED STATES PATENTS

| Number | Name | Date |
| --- | --- | --- |
| 67,702 | Pruden | May 14, 1867 |
| 169,195 | Schwanhausser | Oct. 26, 1875 |
| 376,456 | Walpuski | Jan. 17, 1888 |
| 683,161 | White | Sept. 24, 1901 |
| 1,572,461 | Beasejour | Feb. 9, 1926 |
| 1,912,885 | Brown | June 6, 1933 |
| 2,108,810 | Finsel et al. | Feb. 22, 1938 |
| 2,219,700 | Perrin | Oct. 29, 1940 |
| 2,280,988 | Weiser | Apr. 28, 1942 |
| 2,338,176 | Goepfert | Jan. 4, 1944 |
| 2,368,788 | Tinsley | Feb. 6, 1945 |

FOREIGN PATENTS

| Number | Country | Date |
| --- | --- | --- |
| 8,114 | Great Britain | of 1897 |
| 444,940 | Great Britain | Mar. 31, 1936 |

OTHER REFERENCES

"Spans and Tweens," Atlas Powder Co., Wilmington, Del., 1942, pages 0–4, 7 and 8.

Goldsmith, in "Chemical Industries," March 1943, article entitled "Non-Ionic Surface Active Agents," 3 pages.

"Pentalyn," etc., Hercules Powder Co., Wilmington, Del., October 1943, pages 3, 4 and 5.